3,320,253
4-(β-AMINOPROPIONYLAMINO)-ANTIPYRINES

Herbert Mühle, Basel, Switzerland, assignor to Chemische Fabrik Schweizerhall, Basel, Switzerland, a Swiss company
No Drawing. Filed Dec. 2, 1964, Ser. No. 415,454
Claims priority, application Switzerland, Dec. 3, 1963, 14,777/63
15 Claims. (Cl. 260—247.2)

The present invention relates to a process for preparing new 4-amino-antipyrine derivatives having valuable physiological properties and corresponding to the general formula

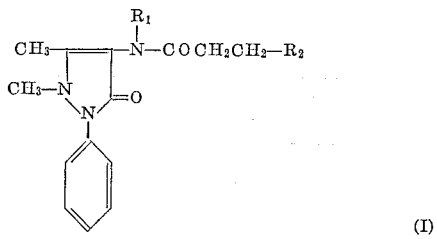

(I)

wherein $R_1$ may denote hydrogen or an alkyl radical and $R_2$ may denote the radical of a saturated or unsaturated, substituted or unsubstituted heterocyclic amine, aromatic amine or araliphatic amine, linked by means of a nitrogen atom, such as a nitrogenous aromatic radical, e.g.

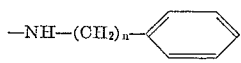

$n$ being equal to 0, 1 or 2, or the radical of an unsubstituted or substituted alkylene imine

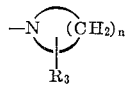

$n$ denoting 3, 4 or 5 and $R_3$ denoting hydrogen or an alkyl, aryl or aralkyl radical, or, e.g., an unsubstituted or substituted 4-aryl-1:2:3:6-tetrahydropyridine, a morpholine or 4-alkylpiperazine radical and the like.

The new compounds of the above said formula are prepared in accordance with the invention by reacting a compound of the formula

wherein R means the radical of antipyrine and $R_1$ means hydrogen or an alkyl radical, with a ω-halo-propionic acid chloride and reacting the resulting compound of the formula

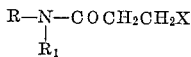

wherein X means chlorine or bromine, if desired with a saturated or unsaturated, substituted or unsubstituted heterocyclic amine, an aromatic amine or an araliphatic amine.

The reaction is preferably performed in an inert organic solvent, e.g., chloroform, benzene, dioxane and the like, at elevated temperature. If the reaction is performed in stoichiometric quantity ratios, an inorganic or tertiary organic base, such as alkali carbonate, triethylamine and the like, is advantageously added to the reaction mixture.

The invention will be described in greater detail with reference to the following examples, but is not intended to be restricted thereto.

Example 1

9 g. of β-bromopropionic acid chloride were added in portions while stirring to a solution of 10 g. of 4-aminoantipyrine and 5.5 g. of triethylamine in 100 ml. of absolute benzene. The solution was stirred for 15 minutes at normal temperature and then heated for a further 10 minutes on a water-bath. The resulting precipitate was filtered off, stirred with water and recrystallized from alcohol. 9 g. (78% of the theory) of 4-(β-bromopropionylamino)-antipyrine having a melting point of 178–180° were obtained.

Example 2

2.6 of piperidine were added to a solution of 5 g. of 4-(β-bromopropionylamino)-antipyrine in 60 ml. of dioxane and the solution was refluxed for 3 hours. After cooling, one separated off from the precipitated piperidine-HBr and concentrated. The residue was dissolved in absolute benzene and filtered. After the addition of petroleum ether, crystals having a melting point of 143–146° formed. After recrystallizing from benzene-petroleum ether, 4 g. (80% of the theory) of 4-(β-piperidinopropionylamino)-antipyrine having a melting point of 149–150° were obtained.

Example 3

10 g. of 4-(β-bromopropionylamino)-antipyrine were dissolved in 100 ml. of absolute dioxane, diluted with 6.8 g. of 4-methylpiperidine and refluxed for 3 hours. After cooling, one filtered off from precipitated 4-methylpiperidine-HBr and concentrated. The residue was dissolved in methylene chloride and washed twice with a small amount of water. The methylene chloride solution dried with sodium sulfate was concentrated and the residue crystallized from benzene-petroleum ether. After recrystallizing from benzene-petroleum ether, 7.8 g. (74% of the theory) of 4-[β-(4-methylpiperidino)propionylamino]-antipyrine having a melting point of 163° were obtained.

Example 4

10 g. of 4-(β-bromopropionylamino)-antipyrine were dissolved in 150 ml. of absolute dioxane, diluted with 8.6 g. of 4-phenylpiperidine and refluxed for 3 hours. One then concentrated, dissolved the residue in methylene chloride and washed three times with water. To crystallize, the methylene chloride solution dried with sodium sulfate was concentrated and diluted with petroleum ether. 9.5 g. of 4-[β-(4-phenylpiperidino)-propionylamino] antipyrine having a melting point of 170–172° were obtained. This compound can also be converted into salts, e.g., hydrochloride or salicylate and the like.

Melting point of the hydrochloride: 263–266° (alcohol-ether).

Example 5

2.5 g. of 4-(β-chloropropionylamino)-antipyrine were dissolved in 50 ml. of absolute dioxane, diluted with 2.4 g. of 4-phenyl-1:2:3:6-tetrahydropyridine and refluxed for 3 hours. The mixture was evaporated, dissolved in methylene chloride and washed three times with 10 ml. of water. Crystallization from benzene-ether. 2.9 g. of 4-[β-(4-phenyl-1:2:3:6-tetrahydropyridino)-propionylamino]-antipyrine having a melting point of 165–167° were obtained. Melting point of the salicylate: 142° (alcohol-ether).

Further examples of compounds obtainable according to the invention and having the general formula

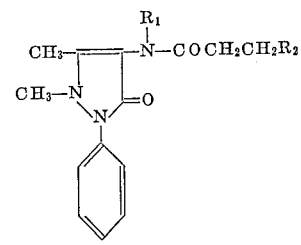

are to be found in the following table:

| Example | $R_1$ | $R_2$ | Sum Formula | M.P., ° |
|---|---|---|---|---|
| 6 | H— | ⟨N—⟩ (piperidino) | $C_{18}H_{24}N_4O_2$ | 160 |
| 7 | H— | 4-methylpiperidino | $C_{20}H_{28}N_4O_2$ | 126 |
| 8 | H— | morpholino | $C_{18}H_{24}N_4O_3$ | 175 |
| 9 | H— | hexamethyleneimino | $C_{20}H_{28}N_4O_2$ | 148 |
| 10 | H— | phenyl—NH— | $C_{20}H_{22}N_4O_2$ | 164 |
| 11 | (CH₃)₂CH— | piperidino | $C_{22}H_{32}N_4O_2$ | 122 |
| 12 | (CH₃)₂CH— | 4-methylpiperidino | $C_{23}H_{34}N_4O_2$ | 130 |
| 13 | H | —N⟨⟩—CH₂CH₃ | $C_{21}H_{30}N_4O_2$ | 161 |
|    |   | salicylate | $C_{28}H_{36}N_4O_5$ | 100 |
| 14 | H | —N⟨⟩—CH₂CH₂CH₃ | $C_{22}H_{32}N_4O_2$ | 145 |
|    |   | salicylate | $C_{29}H_{38}N_4O_5$ | 130 |
| 15 | H | —N⟨⟩—CH(CH₃)₂ | $C_{22}H_{32}N_4O_2$ | 170 |
| 16 | CH₃ | —N⟨⟩—CH₂CH₃ | $C_{22}H_{32}N_4O_2$ | 100 |
| 17 | CH₃ | —N⟨⟩—CH(CH₃)₂ | $C_{23}H_{34}N_4O_2$ | 83 |
| 18 | CH₃ | —N⟨⟩ | $C_{20}H_{28}N_4O_2$ | 82 |
|    |   | salicylate | $C_{26}H_{34}N_4O_5$ | 92 |

Experiments which have been performed with the compounds of the invention have shown that these compounds have analgetic, antipyretic and especially marked antiphlogistic properties with comparatively low toxicity. The compounds of the invention can be used as such or in the form of their water-soluble salts, such as hydrochlorides, tartrates and salicylates. For example, 4-[β-(4-methylpiperidino)-propionylamino]-antipyrine (I) has a better antiphlogistic effect in animal experiments than phenylbutazone (II), as the following comparison shows:

| Preparation No. | Dose in mg./kg. | Protein oedema reduction of swelling compared to the control animals in percent after 2 hours | Dextrane oedema reduction in swelling compared to the control animals in percent after 2 hours | Serotonine oedema reduction in swelling compared to the control animals in percent after 2 hours |
|---|---|---|---|---|
| I | 100 | −30 | | −42 |
|   | 150 | −58 | −29 | −44 |
|   | 200 | −71 | −69 | −60 |
| II | 100 | −20 | −22 | |
|    | 150 | | | |
|    | 200 | −63 | −29 | |

The determination of the antiphlogistic effect was performed on the paw of the rat. To cause the oedema, 0.1 ml. of a 10% emulsion of hen's protein, dextrane in 6% solution or serotonine hydrogen oxalate as a 0.0025% aqueous solution was injected subplantar into the right hindpaw of the animals. The measurement of the paw volume was performed plethysmographically before and 1 and 2 hours after administering the phlogistic agent. Each measurement was performed 3–4 times and the average calculated from the result.

The $DL_{50}$ is in the case of the mouse 328 mg./kg. intraperitoneally and 109 mg./kg. intravenously and in the case of the rat is 4750 mg./kg. per os. Pathological-anatomical tests were also favourable. Thus, no changes in the blood picture of the animals were noticed after administration to rats for 8 months.

In cases of primary chronic arthritis in humans, a decline of marked inflammation was seen after administration of 3 to 4 pills during about 5 to 10 days.

What I claim is:

1. A member selected from the group consisting of compounds of the formula

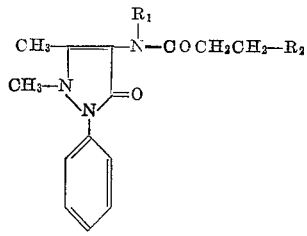

and the pharmaceutically acceptable salts thereof with acids, wherein $R_1$ is a member selected from the group consisting of H and alkyl of 1 to 3 carbon atoms, and $R_2$ is a member selected from the group consisting of

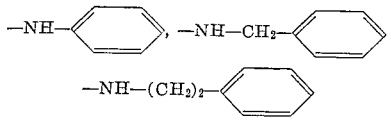

piperidino, alkylpiperidino wherein the alkyl is alkyl of 1 to 3 carbon atoms, phenylpiperidino, pyrrolidino, morpholino, hexamethyleneimino and 4-phenyl-1,2,3,6-tetrahydropyridino.

2. 4-(β-bromopropionylamino)-antipyrine.
3. 4-(β-piperidino-propionylamino)-antipyrene.
4. 4 - [β - (4 - phenylpiperidino - propionylamino]-antipyrine.
5. 4 - [β - (4 - methylpiperidino) - propionylamino]-antipyrine.
6. 4 - [β - (4 - phenyl - 1:2:3:6 - tetrahydropyridino)-propionylamino]-antipyrine.
7. 4-(β-pyrrolidino-propionylamino)-antipyrine.
8. 4 - [β - (2 - methylpiperidino) - propionylamino]-antipyrine.
9. 4-(β-morpholino-propionylamino)-antipyrine.
10. 4 - (β - hexamethyleneimino - propionylamino)-antipyrine.
11. 4-(β-anilino-propionylamino)-antipyrine.
12. 4 - (N - isopropyl - N - β - piperidino - ethyl-carbonylamino)-antipyrine.
13. 4 - (N - isopropyl - N - β - 4 - methylpiperidino-ethyl-carbonylamino)-antipyrine.
14. 4 - [β - (4 - alkylpiperidino) - propionylamino]-antipyrine, alkyl being alkyl of 1 to 3 carbon atoms.
15. 4 - (N - alkyl - N - β - 4 - alkylpiperidino - ethyl-carbonylamino)-antipyrine each alkyl being alkyl of 1 to 3 carbon atoms.

References Cited by the Examiner
UNITED STATES PATENTS
2,912,460  11/1959  Ehrhart et al. _____ 260—562

ALEX MAZEL, *Primary Examiner.*
JOSE TOVAR, *Assistant Examiner.*